Aug. 28, 1934.  W. A. NEILL  1,971,792
SALT FILTER
Filed Nov. 24, 1930   6 Sheets-Sheet 2

Fig. 2.

Inventor
WILLIAM A. NEILL
By Arthur Middleton
Attorney

Aug. 28, 1934.   W. A. NEILL   1,971,792
SALT FILTER
Filed Nov. 24, 1930   6 Sheets-Sheet 3

Inventor
WILLIAM A. NEILL
By Arthur Middleton
Attorney

Aug. 28, 1934.   W. A. NEILL   1,971,792
SALT FILTER
Filed Nov. 24, 1930   6 Sheets-Sheet 5

Inventor
WILLIAM A. NEILL

By
Attorney

Aug. 28, 1934.　　　W. A. NEILL　　　1,971,792
SALT FILTER
Filed Nov. 24, 1930　　6 Sheets-Sheet 6

Inventor
WILLIAM A. NEILL

Patented Aug. 28, 1934

1,971,792

UNITED STATES PATENT OFFICE 1,971,792

SALT FILTER

William A. Neill, Mount Vernon, N. Y., assignor, by mesne assignments, to The Dorr Company, Inc., New York, N. Y., a corporation of Delaware Application November 24, 1930, Serial No. 497,766

19 Claims. (Cl. 210—202)

This invention relates to the art of continuous filtering and is especially directed to an improved continuous vacuum filter of the rotary drum type with particular reference to an arrangement facilitating renewal of the filtering medium in sections, and an organization applicable to the filtering of various kinds of substances and the carrying out of various filtering processes.

In the operation of vacuum filters of the rotary drum type, the filtering medium usually in the form of a panel of cloth or fabric, requires renewal from time to time due to wear or accidental injury. To make such renewal, the filter is stopped with the panel to be changed above the level of the aggregate in the filter drum, the old panel of cloth removed and a new cloth put in place and properly calked around the edges, the operation being performed from within the filter drum or shell.

It is one of the main objects of the present invention to simplify the operation of renewal of the filter medium, shorten the incidental interruption in the filtering operation and eliminate the necessity of working from the inside of the filter drum; by the provision of an arrangement whereby one or more sections of the filtering medium may be renewed, or removed for repair or inspection, by operations carried on from the outside of the filter drum or chamber. An important advantage resulting from the attainment of this object is that in many instances the continuity of the filtering process being carried out by the apparatus is substantially undisturbed by the brief interruption required for such renewal.

A further object of the invention is the provision of an arrangement adapted to various filtering processes and especially to those requiring the use of a large volume of air under controlled temperature together with the prevention of an accumulation of crystallized or otherwise solidified substances in the filtrate discharge passages or on the discharge side of the filtering medium, such, for example, as is required in salt filtering.

Other objects of the invention will appear from a perusal of the following specification and the drawings accompanying the same.

Referring to the drawings in detail, the machine comprises a drum formed of a pair of circular end members, a head casting 1 and an end flange 2, with side wall composed of separate sections constituting filter panel sections 3 removably secured at their ends to the head casting 1 and end flange 2. The drum is rotatably mounted at the head end by means of the large tubular extension 4 of the head casting which extension forms a hollow trunnion and is journaled in a split bearing ring 5. At the other end the drum is rotatably mounted by means of a riding ring 6 formed on the end flange 2 and arranged to ride on the riding rolls 7—8. The drum is rotated by means of the worm gear 9 secured on the end of the hollow trunnion 4, the worm gear being driven by the worm 10 journaled in the bearing support 11 and driven through a drive pulley 12 from a suitable source of power not shown. The bearing support also supports the bearing ring 5.

Each filter panel 3 is formed with a main recess or filtrate compartment 13 opening toward the interior of the drum but separated or partitioned from the interior by a filter medium 14 consisting of a sheet of filter cloth 15 (preferably Monel cloth) backed by a sheet of strong perforated or open mesh material such as the coarse wire mesh 16 bracing the filter cloth against strain or deformation in the direction inwardly of the filtrate compartment. The sheet of filter cloth 15 and its backing 16 are secured to the panel 3 by longitudinal clamping strips 17 and 18, and transverse clamping strips 19 and 20. Clamping strips 17, 19 and 20 clamp the perimeter of the cloth while the longitudinal strip 18 binds the cloth along a central line to a longitudinal rib 21. The heavy mesh 16 is in two sections and is held in place between the rabbeted portions 22 (Fig. 5) and the filter cloth, the rabbeted portions 22 and lugs 23 serving to brace the heavy mesh 16 against sagging. From the foregoing it will be seen that compartment 13, including both its communicating portions divided by the rib 21, is completely partitioned or screened off from the interior of the drum by the filter medium 14, comprised of the filter cloth 15 and heavy mesh backing 16. A longitudinal boss or rib member 24 formed on the outside wall of the filter panel 3, has formed therein a conduit 25 opening into the filtrate compartment 13 through jet openings 26 preferably near the end remote from the head casting 1. A clean-out opening 27 closed by a plug 28, is provided at one end of this conduit. The main filter compartment 13 and the conduit 25 communicate with downwardly extending passages 29 and 30, respectively, terminating at a coupling face portion 31 at the drive end of the panel. The ends of these passages register with the outer ends of channels 32 and 33 respectively, formed in the head casting 1, the engaging surface of the head casting being shaped complementary to said coupling surface so as to form a fluid tight joint therewith through medium of a suitable gasket 34 of rubber or like material.

Figure 2:
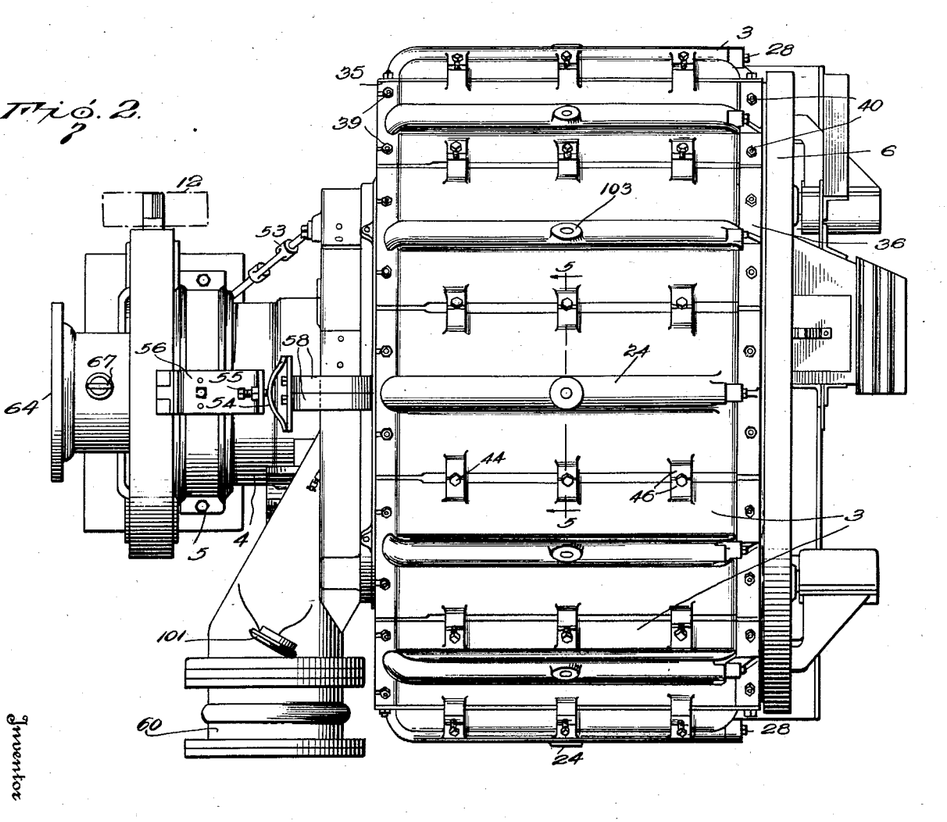
Fig. 2 is a plan view of the same.

For securing the filter panels 3 in place on the head casting 1 and end flange 2, the end flanges 35 and 36 of the panels are provided with bolt openings 37 and 38 (Fig. 6) through which machine bolts 39 and 40 (Fig. 2) are passed into the flange 41 of the head casting 1, and the end flange 2 respectively. To seal the longitudinal joints between adjacent panels 3, longitudinal wedge-shaped rubber gaskets 42 are provided which fit into the spaces between the panels in sealing engagement with the longitudinal cloth clamping strips 17 and the adjacent side edges of the panels. These gaskets are clamped in place by means of the longitudinal seal-clamping bars 43 and clamping screws 44, threaded in the seal clamp nuts 45 abutting outwardly against clamp abutment arms 46 formed on the panels 3.

Figure 7:
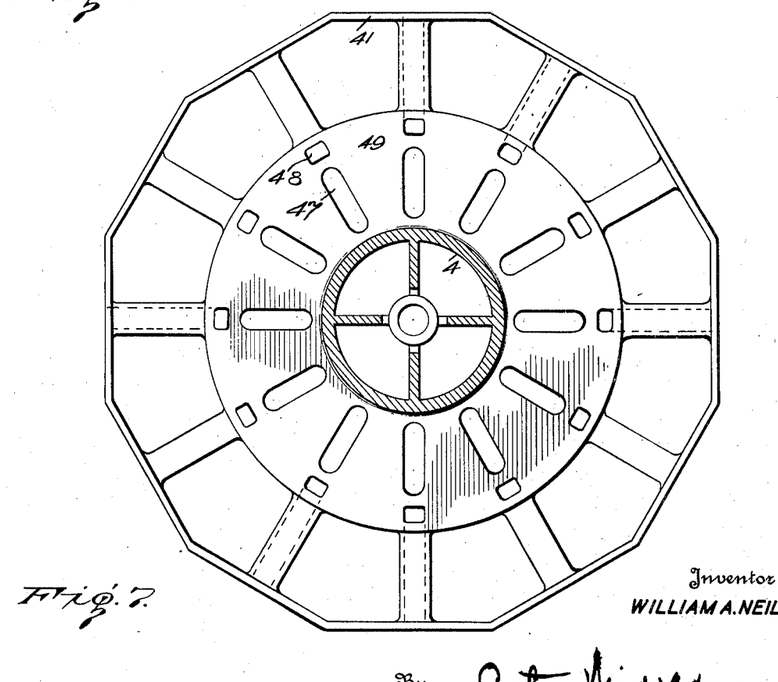
Fig. 7 is an elevation of the valve seat.

The channels 32 and 33, one set for each filter panel, extend radially through the head casting 1, toward the cylindrical projection 4 and then outwardly, terminating in separate ports 47 and 48 respectively, in the valve seat 49 (Fig. 7). The ports 47 and 48 are arranged in concentric circles, (Fig. 7) which register with concentric circular channels, 50 and 51 respectively, in an annular valve cover 52 surrounding the tubular extension 4 and bearing against the valve seat 49. A torsion rod 53 and the various pipe connections to the valve cover to be later described, hold the valve cover against turning, while the cover is held against the valve seat 49 under tension by means of the leaf spring 54, whose tension is adjusted by means of an adjusting screw 55 carried by a bracket 56 secured to the top or cap portion of the ring bearing 5. A suitable packing ring 57 is arranged between the stationary valve cover and the cylindrical extension 4. For convenience in mounting, the valve cover is made in the form of a split ring secured together by the radial flanges 58.

Figure 1:
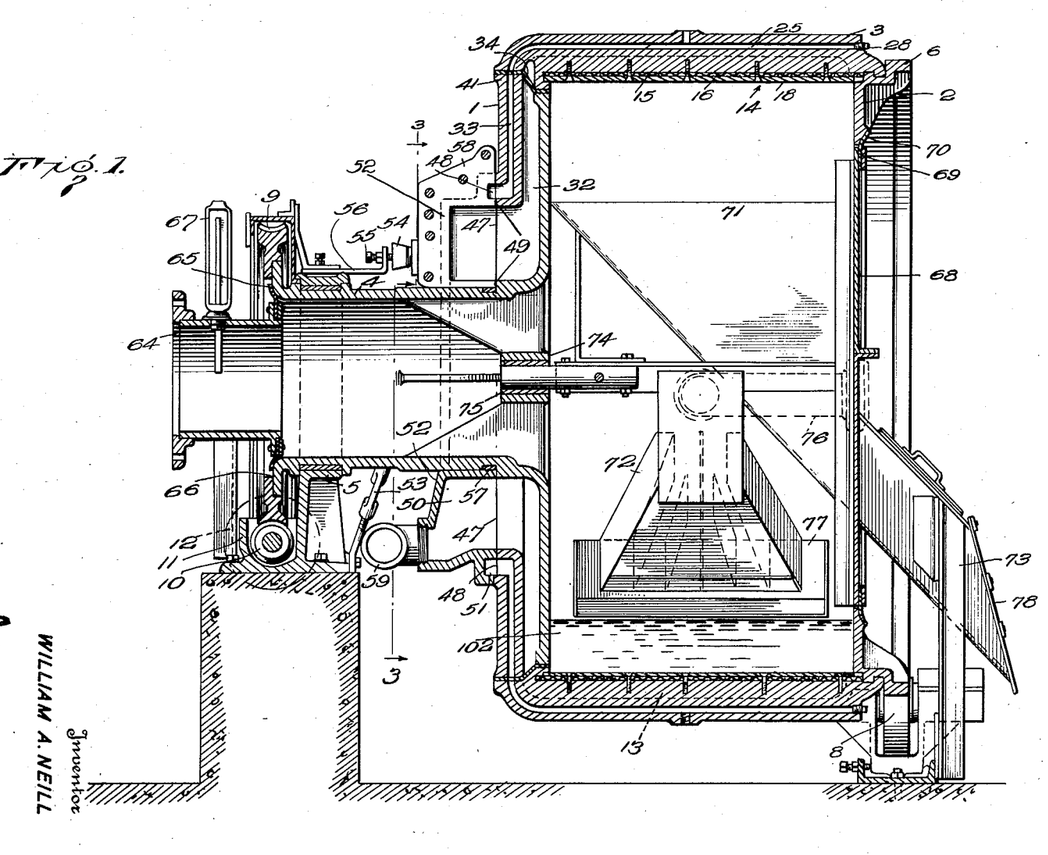
Fig. 1 is a vertical longitudinal section of a filtering apparatus embodying the invention.
Figure 3:
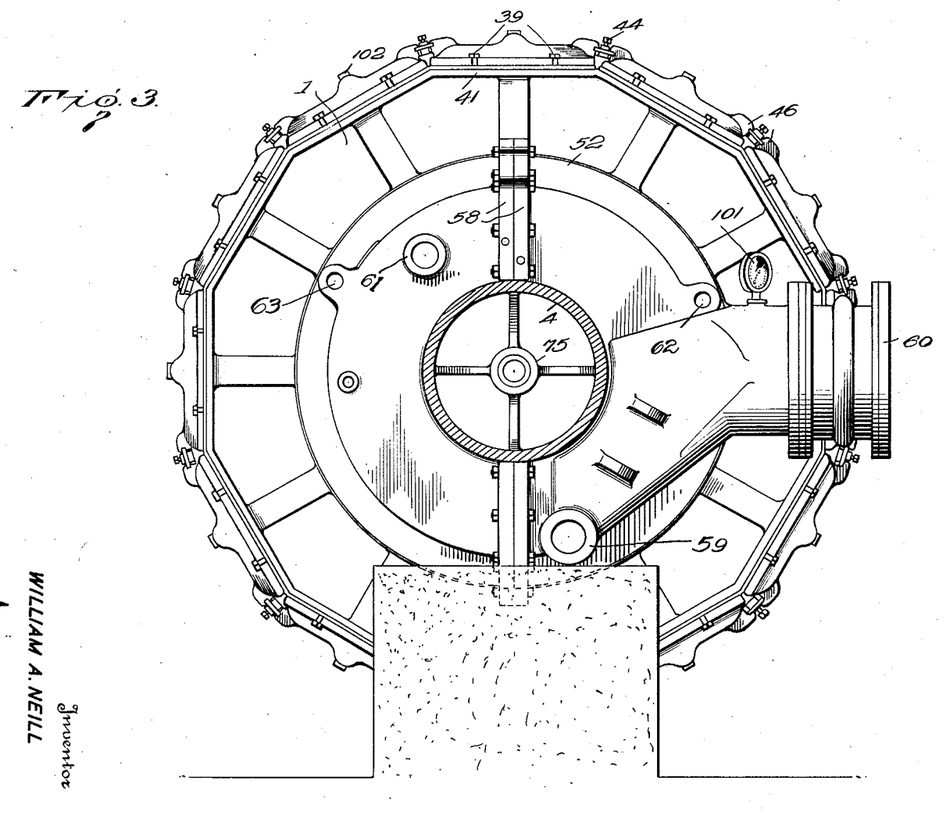
Fig. 3 is an elevation of the head or drive end, in section on the line 3—3 of Fig. 1.

A filtrate coupling 59 (Figs. 1 and 3) connects with the inner circular channel 50 near the lower portion of the valve cover while just above this connects an air outlet or suction coupling 60 of relatively large diameter. A blow out coupling 61 (Figs. 3 and 8) also connects with the inner circular channel near the top. Steam and water couplings 62 and 63 respectively, are also formed in the valve cover in communication with the outer circular channel 51.

Figure 8:
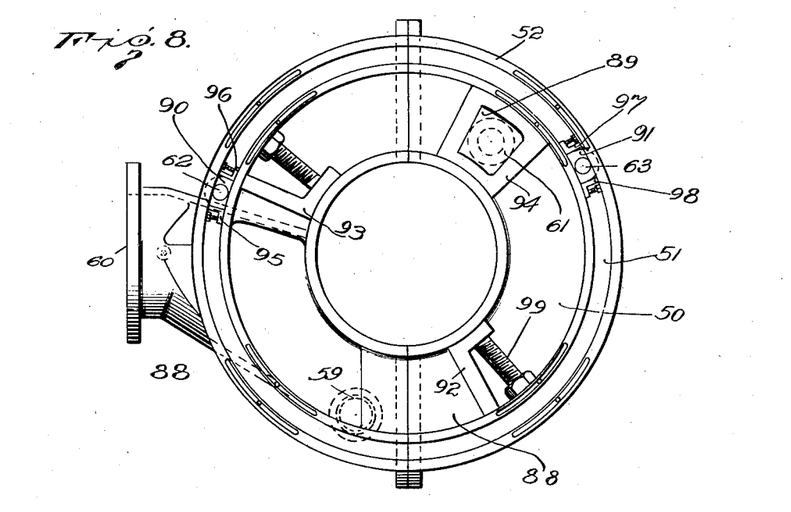
Fig. 8 is an inside face view of the valve cover.

As will be seen from Fig. 8, the concentric channels in the valve head are divided into separate valve chests or compartments 88, 89, 90 and 91 about the fluid couplings by means of bridges or dams 92 to 98. The compartment 88 is communicated with by the filtrate outlet coupling 59 and the air outlet coupling 60, compartment 89 is in communication with the blow off coupling 61, compartment 90 is in communication with steam coupling 62, and compartment 91 is in communication with the water coupling 63. In order to vary the timing or point in rotation at which the valve ports in the valve seat 49 move into and out of communication with the various compartments in the valve head, the dams or bridges 92, 93 etc., are arranged to be moved about in the circular channels and locked by clamping screws such as the clamping screw 99 of the bridge 92.

It is noted that the structural arrangement is such that the air outlet coupling 60 covers nearly the entire area of the compartment 88. At its base the coupling or connection is flattened out thereby adapting itself to said compartment 88. That is to say, there is a transition from the compartment 88 into a circular or flanged portion which latter is of relatively large diameter, indicating the handling of large volumes of dry gas thru the filter. The use of large volumes of heating and drying gas under relatively low pressure has been found to be more effective than a more rapid stream of gas of higher pressure. From the drawing Fig. 3 it is noted that the filtrate outlet coupling 59 is located at the bottom of the filter compartment 88 and considerably below the air outlet coupling 60, allowing the filtrate to gravitate away, while practically no liquid matter is drawn into the air duct located above. This is essential in that substantially no liquid will reach the air blower or other sensitive portions of the air duct, which otherwise might tend to corrosion especially with brines or other metal attacking liquids handled.

To supply air under control, particularly as to temperature and humidity, to the interior of the drum structure, a large diameter air-inlet connection 64 is coupled to the outer opening of the tubular extension 4 through a rubber seal ring 65 secured to a flange on the air-inlet and arranged in sliding contact with the outer surface of the flange portion 66 of the tubular extension 4. A thermometer 67 is mounted in the air-inlet 64.

In order to maintain proper or controlled atmospheric conditions in the interior of the drum, the opening in the end flange 2 is covered by a flat, circular, stationary cover plate 68, the periphery of the cover plate being provided with a rubber seal ring 69 in sliding contact with a circular seat 70 at the inner rim of the flange 2.

The cover plate, discharge chute 71 and feed distributor 72, are supported as a whole at one end outside the drum by the supporting structure 73, and at the other end within the drum on a trunnion 74 journaled in a spider supported hub 75 in the tubular extension 4. A feed pipe 76 extends through the cover plate into the interior of the drum where it terminates in the feed distributor 72 arranged to distribute the aggregate over a splash board 77 onto the filter panels 3 passing below. The angular positions of discharge end of the distributor and the splash board, in relation to the drum, are shown in the diagram Fig. 9. To guard the atmospheric conditions within the drum from disturbance by the entrance of outside air through the chute, the discharge end of the chute is provided with a gravity closed cover 78 arranged to be opened by the passage of the discharge through the chute and to remain open only during discharge.

Figure 9:
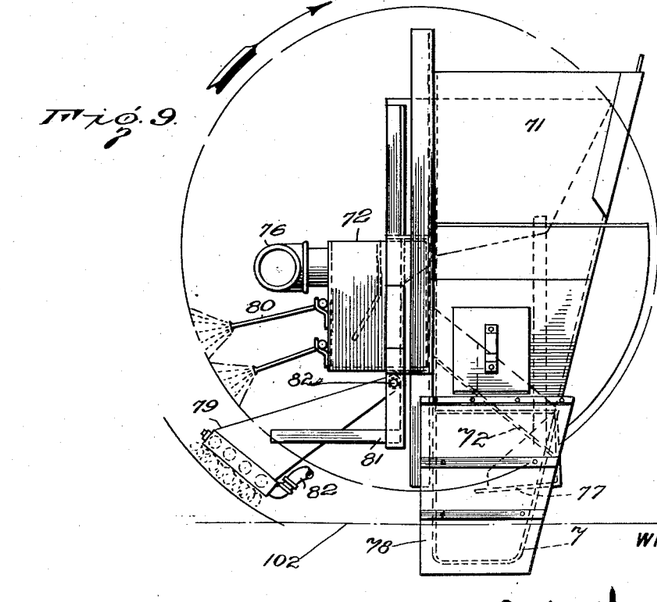
Fig. 9 is an end elevation looking from the right in Fig. 1 and showing the chute and other stationary parts mounted within the drum with the drum and other appurtenances omitted.

As shown in Fig. 9, there is also mounted within the drum, together with the distributor, heating means in the form of a steam chest 79, and spray pipes 80. The steam chest is mounted by means of the brace structure 81 in a position to supply heat to the filter cake as it leaves the liquid level near the bottom of the drum. Steam is supplied to the steam chest through the steam hose connection 82 coupled to the steam connection 83 in the cover plate 68. The spray pipes 80 are adjustably mounted one above the other outside on the back of the feed distributor 72 and are arranged to be coupled by suitable hose extensions (not shown), to the water connections 100, mounted in the cover plate 68. A door 84 in the top of the outside portion of the discharge chute, and other doors 85, 86 and 87 in the cover plate 68, serve as inspection doors and afford accessibility to various parts within.

Figure 4:
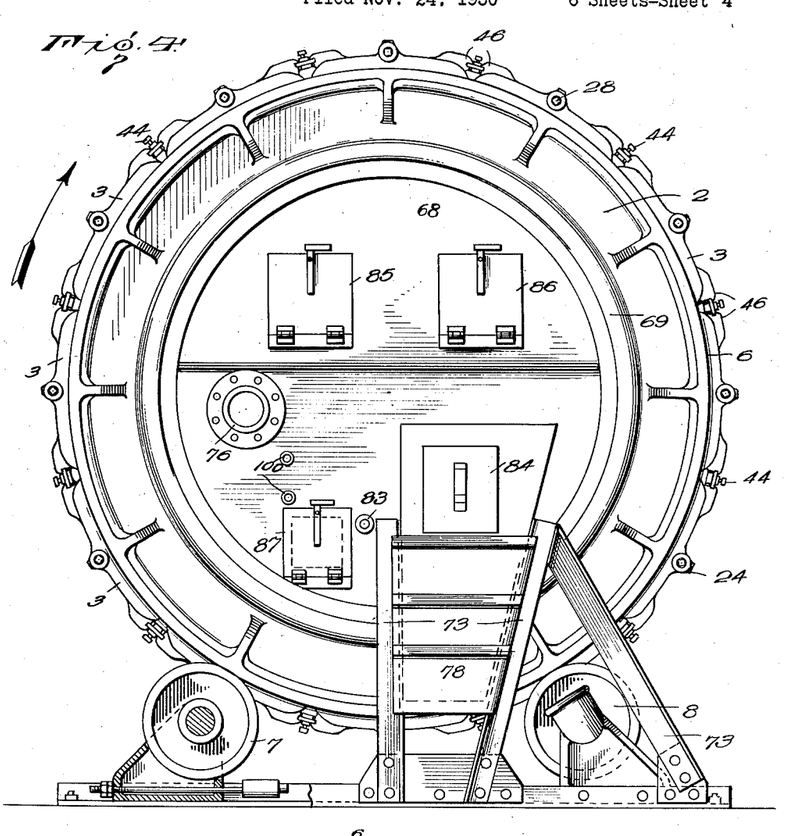
Fig. 4 is an elevation of the right end of Fig. 1.

In operation, power is applied to the pulley 12 from a suitable source (not shown) to drive the worm 10 and worm gear 9 in a direction which will rotate the drum in the direction indicated by the arrows in Figs. 4 and 9, the drive end of the drum rotating in the trunnion bearing 5 while the discharge end turns on the riding rolls 7—8. Assuming the apparatus to be operating as a salt filter, warm air from a suitable source of supply is admitted through the air inlet 64 and the tubular extension 4 of the head casting 1 into the interior of the drum, while a vacuum, produced by any suitable means not shown, is applied to the suction outlet 60. The temperature of the air is suitably controlled to maintain the desired temperature indication on the thermometer 67, while the production of vacuum is suitably regulated to give the desired degree of sub-atmospheric pressure as will be indicated by the pressure gauge 101. At the same time air under suitable pressure is applied to the coupling 61 leading to the compartment 89 in the valve head (Fig. 8), and steam under suitable pressure is applied to the coupling 62 leading to the compartment 90 in the valve head. The feed, consisting of the aggregate of the substance being treated, for example, salt crystals in the mother liquor, passing in by way of feed pipe 76, distributor 72 and splash pan 77, is distributed over the filter panels 3 as they pass under the splash pan 77 (Fig. 9) slightly before the lowermost position is reached, whereupon the vacuum applied to the filter outlet coupling 59 and transmitted through the valve compartment 88 and conduit 32 to the filtrate compartment 13, effects de-watering of the aggregate by drawing the liquor through the filtering medium, which liquor or resultant filtrate is drawn through the conduit 32 and its corresponding valve port 47 into the valve head compartment 88 and out through the filtrate discharge 59.

As the drum revolves the aggregate is further dewatered forming a cake on the inside surface of the filtering medium, the cake continuing to be dewatered and dried after passing above the solution level 102 (Figs. 1 and 9) by a large volume of warm air drawn from the interior of the drum through the filter cake, and out by way of the filtrate compartment 13, conduit 32, valve compartment 88 and air outlet coupling 60. If it is desired to further boost the temperature of the filter cake or the atmosphere in the immediate vicinity of the filter cake during this drying operation, the steam chest 79 is maintained hot by the admission of steam thereto through steam coupling 83, the steam chest being positioned in proximity to the inner surface of the filter cake as indicated in Fig. 9.

As the filter panel continues to move upwardly, the vacuum is maintained in the filtrate compartment 13 until the valve port 47 associated with said compartment passes the bridge 93, defining the upper limit of the valve head compartment 88, whereupon the vacuum is cut off. Before the vacuum is shut off, however, the valve port 48 of the conduit 33 is brought into communication with the valve chamber 90, admitting steam through the conduits 33 and 25 and apertures 26, into the filtrate chamber, over the back or discharge side of the filtering medium for the purpose of adding sufficient temperature and moisture to prevent the formation of crystals or scavenge cleanse, flush, or redissolve out any solidified matter that might have formed. After this steam supply has been cut off by passage of the valve port 48 past the bridge 96 defining the upper limit of the valve compartment 90, the filtering panel with its associated valve ports continues to move upwardly and over to the right (Fig. 9) until the filter cake carried thereby has passed completely over the leading edge of the upper opening of the discharge chute, whereupon the valve port 47 coming into communication with the valve head compartment 89, permits air under pressure to be blown through the conduit 32 into the filtrate compartment 13, causing the cake to fall freely from the filtering cloth into the discharge chute, whence it passes the discharge gate 78, which gate closes by gravity immediately after discharge.

When it is desired to further cleanse the filtrate compartment and filtering medium after discharge and before the latter receives a fresh charge of the aggregate, the valve compartment 91 is rendered effective by the connection of a source of water supply to the water connection 63, with the result that during the downward passage of the filtering panel from the point of discharge to the liquid level near the bottom of the drum, the movement of the valve port 48 into communication with the valve chamber 91 will permit water to flow from the valve chamber 91 through conduits 33 and 25 and apertures 26, into the filtrate compartment. That is to say, a restricted quantity of liquid in the way of a film is spread over the filter medium, which quantity is sufficient to effect redissolution of matter which has solidified upon the medium from mother liquor, but which is insufficient to flood the filter chamber. Such solidified matter may for instance have formed upon the filter medium under the desiccatory effect of the preceding air blast incidental to the cake blow off. The timing in the cycle of operation of this further step of cleaning just described, is determined by obvious proper adjustment of the bridges 97—98 defining the limits of the valve compartment 91.

In distinction from back wash arrangements where wash liquid is supplied to the filter cells by reverse flow through the filtrate suction conduits, it is noted that the conduit means 25 and 26 are separate from the filtrate suction means and preferably so disposed along the sides of the filter cells that liquid will discharge laterally therefrom onto and transversely across the filter media. The liquid thus applied to the filter medium may gravitate therealong and upon reaching the then lower side of a cell penetrate through the lower edge portion of the filter medium and continue onto the filter medium of the adjoining next lower filter cell, the cells then being on their way towards submersion in the filter bath.

The function of the scavenging or cleansing fluids introduced at the filtrate side of the filter panels at certain points of the cycle is more thoroughly explained as follows: It will be understood that every draft of dry or heated air passing through the filter medium of the panels will have the tendency to crystallize some of the saturated solution or brine in the filtrate chamber and on the filter medium, for instance in the case of salt filtration. Therefore, such will be the effect of a draft of hot gas or drying air through the filter cake, after the cake has emerged from the bath. Now, in order to compensate that undesirable effect, a fluid, for instance, saturated steam is admitted on the filtrate side of the filter medium, said steam being of such low pressure as would not blow off the cake, or have the tendency to penetrate the same, but merely supply sufficient heat and moisture at the filtrate side of a filter panel to counteract crystallization. It can be seen from Fig. 8 that the steam flushing period is relatively short, as can be seen from the length of the zone 90 in the valve cover, and located just ahead of the cake blowoff zone. Wash water would not be suitable at this point on account of the possibility of remoistening the cake.

Thereafter, follows the cake blow-off period, which again has the tendency to crystallize whatever film of brine may be left on the filtrate side of the filter medium or on the filter medium proper. Therefore, again a wash or dissolving fluid is introduced in the zone 91 that follows the cake blow-off zone 89. While the filter medium is now free from cake, it should be understood that the fluid admitted after the cake blowoff is merely a means of rinsing or flushing the filtrate side of the panel with an amount of fluid substantially just sufficient for the purpose of dissolving the solidified matter. In this step it has been found to be beneficial to have wash water cover the filter medium in the form of a film as it rinses down, thereby redissolving whatever solidified matter might be attached to the filter medium and keeping it ready for the new cycle. In this particular filter arrangement, the use of liquid at this point, rather than for instance steam, reduces the danger of the dry air within the drum getting saturated and rendered less fit for the purpose of cake drying.

Hence it follows that the steps of cleansing the filtrate side of the filter medium at certain points of the cycle, in order to free the filtrate side from crystals or solidified matter offer distinct advantages over such known back wash arrangements as would force a wash liquid or fluid under pressure through the filter medium for the purpose of clearing the pores of the medium.

Figure 5:
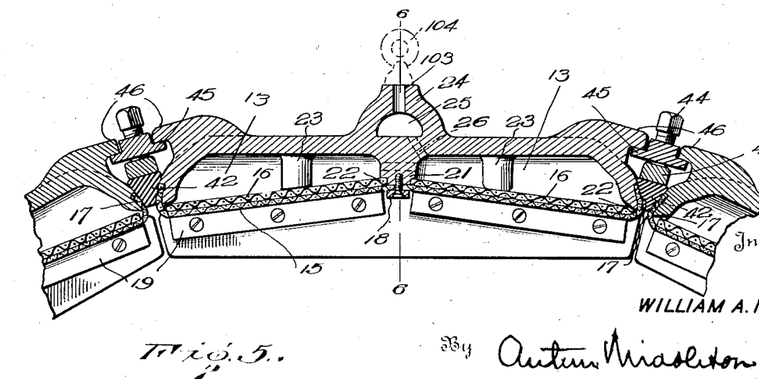
Fig. 5 is a section on a large scale taken on the line 5—5 of Fig. 2.
Figure 6:
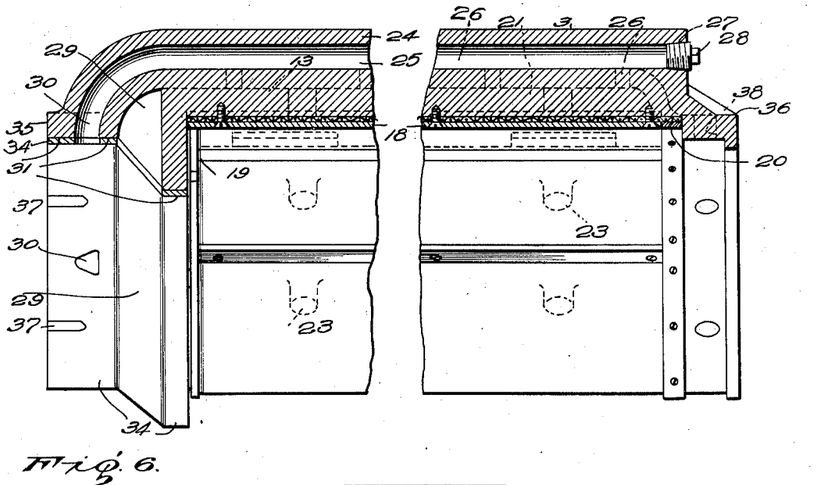
Fig. 6 is a section taken on the line 6—6 of Fig. 5.

A clear illustration of the character of the cleansing steps can be found in Figures 5 and 6. This illustration shows that the flushing fluid is led through the separate channel 25 to a point 26 remote from the panel outlet, for the reason that the low pressure fluid or liquid needs positive distribution over the entire filtrate side of the filter medium, whereas otherwise that fluid would have the tendency to short circuit to the panel outlet without fully covering the filter medium. In the manner of admission indicated, wash fluid will spread over the entire medium.

When it is desired to wash the cake before discharge, the spray pipes 80 (Fig. 9) are supplied with water through the water connection 100. With the spray pipes adjusted as indicated in Fig. 9, the filter cake will be sprayed while in an angular position after leaving the liquid level and before the vacuum is cut off from the filtrate compartment, so that a large portion of the washing spray will be drawn through the filter cake. This spray washing operation is not, of course, used in combination with the use of the steam chest 79.

If during the operation it becomes necessary to renew or repair the filtering medium, the machine is stopped when the filtering panel 3 containing the section of filtering medium to be renewed is at or near the top. The clamping bolts and nuts 44—45, sealing clamps 43 and gaskets 42 at the sides of the panel are then removed, the clamping bolts 39 and 40 at the ends of the panel disengaged, and the panel removed and replaced by a perfect one, which is bolted on and sealed in the same manner as the former. The machine is then ready to resume operation. It will be clear from the above that with substitute panels immediately available, the replacement may be made with almost negligible interruption to the operation and little or no variation in the process being carried out. It will be noted further that even where a substitute panel is not available, the renewal or repair of the filter medium is facilitated to such an extent by the easy accessibility of parts with the panel removed, as to enable the change to be made in a very short time comparable to that heretofore required in filters of this general type. To aid in handling the sections, each is provided with a lifting lug 103 (Figs. 2 and 5) bored and threaded to receive a lifting eye bolt 104 by which the section may be handled by suitable mechanical handling means, such as a crane.

Where high temperatures are used, for example in the neighborhood of 700 degrees Fahrenheit, the hot air or gases may be admitted at the solids-discharge end in any suitable manner as through a conduit leading into the interior of the filter through the cover plate 68, the bearing 5 and parts adjacent thereto as well as the valve cover 52 and tubular extension 4, being cooled by a suitable water jacket or jackets. With such an arrangement the feed pipe 76 may be led into the filter through the tubular extension 4, the outer end of the tubular extension being closed around the feed pipe to prevent circulation of the hot gases through the extension 4. The object of cooling the bearing and valve cover is of course, primarily to maintain the bearing surfaces of these parts at a temperature sufficiently low to permit adequate lubrication and secondarily to prevent undue heating of adjacent parts such as the driving gear.

It should be noted that the internal type of filter as here disclosed lends itself particularly well to the handling therein of auxiliary gases, such as hot dry gases, for the purpose of drying the filter cake and conditioning the atmosphere in which the cake is being treated in the filter. It can be readily seen that the interior of the drum itself forms the confines for the gases or hot air introduced therein, requiring merely a cover and flexible closure strips as shown at 68 and 70, or at 64 and 65. These simple attachments allow to convert readily the internal type suction filter for the special purpose indicated. Thus the interior of the drum itself forms the gas chamber, in which preferably a large amount of gas is drawn through the cake drying zone, and off through the large suction connection 60.

It should be noted that the atmospheric pressure outside the drum will help to keep the flexible strips 70 tight upon their seat without any other particular measures, so that leakage is reduced to a practical minimum with simple and inexpensive means, while the vacuum inside the drum maintains. In a similar way, the atmosphere tends to tighten the cover 78 of the cake discharge chute, thus preventing any considerable leakage there-through. Under such operation the cover or closure piece upon the discharge chute need not necessarily be particularly weighted to insure proper closure, but being a one way passage, may be made light and easily responding so that the discharging filter cake will not encounter undue resistance nor entirely pile up in the discharge chute.

Another feature of practical importance lies in the structure proper of the detachable filter panel, and in the specific arrangement of the filter media thereon.

For the purpose of salt filtering specifically, it is advisable to use a non-corroding filter medium as for instance Monel wire mesh or so called Monel cloth. This filter material is suitably arranged in plane elements as indicated in Fig. 5, the whole of the elements forming a polygonal filtering surface. The plane shape is here chosen for a two-fold purpose. First, the metal cloth would break under constant oscillating flexures if it were arranged in circular shape and without further means of retaining the cloth upon a backing, secondly with a circular or arching shape it would be more difficult to discharge the filter cake which is rather stiff and rigid when sufficiently dry.

It has furthermore been found that, unless the filter area is subdivided into a sufficient number of plane elements, so as to form a polygon approximating closely enough the general shape of a circle, the filter cake upon each element would tend to be "spotty" that is to say of uneven dryness, the center being relatively dry, with the side portions remaining moist. To explain this, it has been observed that, while the filter surface has a polygonal shape, yet the surface of the cake formed thereon will be circular, so that the cake will be thicker and wetter in the corners of the polygon and thinner and drier in the central portions of each side of the polygon.

The result would be that the average moisture of the discharged cake would be unduly high when the filter planes are too few and relatively too large. However, by reducing the width of the plane filter element, that is by increasing the number of elements of the polygon, it is possible to eliminate that trouble, inasmuch as thereby the differences in thickness are equalizd and consequently a cake of greater dryness is obtained.

Furthermore, in order to reconcile the demand for a sufficiently large number of plane filter elements, with the economical limit in the number of detachable filter panels, the preferred design of a filter panel shows two plane filter elements accommodated in a single detachable panel element.

While a preferred embodiment has been specifically described for the sake of disclosure, it is to be understood that the application of the invention is not limited to such specific embodiment, but embraces all such modifications and variants as fairly fall within the scope of the appended claims.

What I claim is:

1. A rotary filter comprising a drum, detachable filter panels constituting portions of the side wall of the drum and each having a compartment opening toward the interior of the drum, a filtering medium carried by each panel and separating the panel compartment from the interior of the drum, means carried by the drum forming a conduit in communication with the panel compartment, means for sealing the connection between the compartment and the conduit, and means for sealing the connection between the panel and the drum.

2. A rotary filter comprising a rotatable container, a filter panel forming a separable wall section of said container, a filtering medium carried by the panel and spaced inwardly thereof to form a partition between the interior of the rotatable container and the space between the filter medium and the panel, means for securing the filter panel to the said rotatable container, means forming a fluid channel separated from the interior of the container, and means for connecting the space between the panel and the filtering medium with said fluid channel by the attachment of said panel to said container.

3. A rotary filter comprising a plurality of separate containers arranged in an annulus to form the walls of a rotatable container, a filtering medium carried by each container and separating the interior of its associated container from the rotary container formed by said separate containers, means for securing said separate containers in place, means forming a plurality of conduits, one for each chamber, and means for connecting each chamber with its respective conduit.

4. A rotary filter comprising a rotatable drum structure composed of a pair of end portions and a side wall composed of separate filter panels removably secured to said end portions, each filter panel having a compartment separated from the interior of the drum structure by a filter medium, one of said end portions being provided with a channel for each filter panel separate from the interior of the drum structure and arranged to be brought into communication with the compartment of its respective panel through the connection between said panel and said one end portion, and packing means between adjacent panels and between said panels and said end portions.

5. A rotary filter comprising a pair of end members and a plurality of filter panels removably secured to the end members to form a drum structure, each of said panels being provided with a filtrate chamber covered on the inside by a filtering medium, a passageway in each panel communicating with the filtrate chamber and terminating at a surface of the panel near one end in juxtaposition to one of the end members, one of said end members having passageways formed therein one for each filtrate chamber terminating at the surface of the end member in register with said first mentioned passageways, and sealing strips between the adjacent side edges of the filter panels extending from one end member to the other end member and removable outwardly of the drum structure.

6. A filtering system comprising an aggregate chamber closed from the outside atmosphere, a filtrate chamber, a filtering medium separating the filtrate chamber from the aggregate chamber, means for supplying warm air to the aggregate chamber, and means for withdrawing liquid from the aggregate and air from the aggregate chamber through the filtering medium into the filtrate chamber whereby a vacuum is maintained in the aggregate chamber, together with a filter cake discharge conduit leading from the interior to the exterior of the aggregate chamber, and means associated with said discharge conduit operable to prevent the entrance of air therethrough into the aggregate chamber, and which includes a closure means aided in its operation by said vacuum maintained in said aggregate chamber.

7. A filtering system comprising an aggregate chamber closed from the outside atmosphere, a filtrate chamber, a filtering medium separating the filtrate chamber from the aggregate chamber, means for supplying warm air to the aggregate chamber, means for withdrawing liquid from the aggregate chamber and air from the aggregate chamber through the filtering medium into the filtrate chamber, whereby a vacuum is maintained in the aggregate chamber, together with a filter cake discharge conduit leading from the interior of the aggregate chamber to the outside, and means associated with said discharge conduit to prevent the entrance of air therethrough into the aggregate chamber, and which includes a closure flap aided in its operation by the vacuum maintained in said aggregate chamber.

8. In a rotary suction drum filter of the internal type, having circumferentially arranged filter panels with endwise cake discharge as described, a stationary cover member for the cake discharge end of the drum, including flexible marginal closure strips, means for conveying material through said cover without the admission of atmospheric air, stationary means for introducing auxiliary drying gases into the interior of the drum, and means for drawing said gases through the filter panels.

9. In a rotary suction drum filter of the internal type having circumferentially arranged filter panels, a stationary closure by which to confine the interior of the drum against the atmosphere and including flexible marginal closure strips, means for admitting auxiliary gases into the interior of the drum through said closure, means for feeding and means for discharging material through said closure, substantially without the admission of atmospheric air, and suction means for drawing the auxiliary gases through the filter panels in a drying zone of the drum.

10. In a rotary suction drum filter of the internal type having circumferentially arranged filter panels, a stationary closure by which to confine the interior of the drum against the atmosphere and including flexible marginal closure strips, means for admitting auxiliary gases into the interior of the drum through said closure, means for feeding and means for discharging material through said closure, substantially without the admission of atmospheric air, and suction means covering a relatively large drying suction zone in the drum for drawing the auxiliary gases through the filter cells, and cake blow off means covering a relatively small zone in the drum, the proportion between both zones being such that the volume of the auxiliary drying gas far exceeds the volume of the blow off gas, thereby maintaining a vacuum in the interior of the drum causing the closure strips to tighten upon their seat.

11. A rotary filter according to claim 1, in which each detachable filter panel with its compartment accommodates a plurality of filter planes side by side and having angular relation to each other.

12. A rotary filter according to claim 1, in which each detachable compartment accommodates a plurality of filter planes side by side and having angular relation to each other, the filter medium being of non-corrosive wire mesh.

13. A rotary filter according to claim 1, in which each detachable compartment accommodates a plurality of filter planes side by side and having angular relation to each other, the filter medium being of Monel metal.

14. A continuously operating combined filter and filter cake drier, for the filtration of mother liquor from soluble precipitates, comprising an aggregate chamber, a filtrate chamber, a filtering medium separating both chambers, means for drawing filtrate from said filtrate chamber to form a filter cake during submergence of the medium in the aggregate, means for forcing in the direction of filtrate draft a drying gaseous fluid though the cake after filtration, means for admitting steam to the filtrate chamber substantially simultaneously with said drying fluid draft, the point of steam admittance being remote from the exit of said drying fluid from the filtrate chamber, so as to prevent short circuiting of the steam to said exit, and means for discharging the filter cake from the filter.

15. A continuously operating combined filter and filter cake drier, for the filtration of mother liquor from soluble precipitates, comprising an aggregate chamber, a filtrate chamber, a filtering medium separating both chambers, means for drawing filtrate from said filtrate chamber to form a filter cake during submergence of the medium in the aggregate, means for forcing in the direction of filtrate draft a drying gaseous fluid through the cake, air-pressure means for dislodging the cake from the filter medium, means for admitting steam into the filtrate chamber and substantially simultaneously with said drying fluid draft, and means for remoistening the filter medium by a film of liquid spread thereon prior to resubmergence thereof in the aggregate to cause redissolution of matter which has solidified upon the filter medium under the desiccating effect of the preceding air draft.

16. In a rotary suction drum filter having circumferentially arranged filter panels, and a cake forming and a cake drying zone, a circular master valve arrangement operative by the drum rotation to control the working phases of a filter panel in cyclic order, said master valve arrangement comprising a valve sector corresponding to the combined cake forming and cake drying zone, a suction nozzle extending from the upper portion of said sector for drawing said gaseous fluid, and a drain connection at the lower portions of said sector for discharging filtrate also drawn by the suction of said suction nozzle.

17. Master valve arrangement according to claim 16 in which the suction nozzle is of relatively large diameter adapted to draw therethrough large amounts of a heated gaseous fluid passing through the filter cake, said nozzle extending laterally from said valve and being formed with a transition from circular into flat configuration in conformity with the shape of the valve sector.

18. In a continuously operating vacuum filter for filtering mother liquor from soluble precipitate, an arrangement comprising an aggregate chamber, a filtrate chamber, a filter medium separating said chambers and movable with said filtrate chamber through an aggregate bath, conduit means for drawing filtrate from the filtrate chamber and effective to form a cake upon the filter medium from the aggregate while submerged therein, blow off means for removing the filter cake from the filter medium after emergence thereof from the aggregate, and separate conduit means for supplying liquid moisture to the filtrate side of the filter medium in addition to that supplied from the filter cake, said separate conduit means extending along the said filtrate chamber and across the path of movement thereof and adapted for discharging a restricted quantity of liquid laterally therefrom onto and substantially transversely across the filter medium to effect redissolution of matter which has become solidified upon the filter medium from the mother liquor.

19. In a rotary vacuum drum filter having circumferential filter cells for filtering mother liquor from soluble precipitate, and in which the cells move consecutively through a bath of the aggregate to be filtered, an arrangement comprising conduit means for drawing filtrate from a filter cell and effective to form a cake upon the filter medium from the aggregate, means for removing the filter cake from the filter medium after emergence thereof from the aggregate, and separate conduit means for supplying liquid moisture to the filtrate side of the filter medium in addition to that supplied from the filter cake, said separate conduit means extending along side the said filtrate chamber and having permanent communication therewith and adapted for discharging a controlled quantity of liquid laterally therefrom onto and substantially transversely across the filter medium to effect redissolution of matter which has become solidified upon the filter medium from the mother liquor.

WILLIAM A. NEILL.